United States Patent Office 3,515,775
Patented June 2, 1970

3,515,775
POLYOLEFIN BLENDS FOR FILMS AND SHEETING
Robert Leonard Combs, David Frank Slonaker, and Willis Carl Wooten, Jr., Kingsport, Tenn., assignors to Eastman Kodak Company, Rochester, N.Y., a corporation of New Jersey
No Drawing. Continuation-in-part of application Ser. No. 534,649, Mar. 16, 1966. This application Dec. 1, 1967, Ser. No. 687,097
Int. Cl. C08f 37/18
U.S. Cl. 260—897          3 Claims

ABSTRACT OF THE DISCLOSURE

A composition blend capable of being formed into optically clear products comprising about 75%–98.5% by weight of a crystalline polypropylene having a density $\geq 0.89$ and a melt flow $>12$, about 0.5%–10% by weight of a crystalline polyethylene having a density $\geq 0.93$ and a melt index $\geq$ about 5, and about 1%–15% by weight of an amorphous ethylene-propylene copolymer having an inherent viscosity of 0.3–0.9 and a second order transition temperature $\leq -15°$ C.

---

This application is a continuation-in-part of our copending application Ser. No. 534,649, filed Mar. 16, 1966.

This invention is related to the subject matter of our coworkers in Coover, Joyner and Weemes companion U.S. application Ser. No. 477,029, filed Aug. 3, 1965, but distinguishes therefrom in certain respects as will be apparent from the description hereinafter set forth. This invention particularly concerns certain polyolefin blends, which blends may be extruded or similarly formed into films of unusual clarity coupled with good toughness and stiffness.

As explained in said companion application, in the industry there are a number of polyolefin materials already available such as polypropylene and polyethylene of various molecular weights and densities. Such materials comprised substantially or completely of the polyolefin either in their relatively undiluted form or containing inhibitors, pigments and the like additives have numerous uses. Notwithstanding the benefits which have been accomplished by the incorporation of such additives, these polyolefin compositions have not possessed properties enabling them to be manufactured into films possessing a high degree of clarity and certain other properties.

While it has been proposed to blend other materials in addition to the aforesaid additives with polyolefins in substantial amounts in an attempt to further improve the properties, as far as we are aware prior to our invention no blend has been accomplished which was capable of producing films of a quality producible by the present invention. In further detail, it is known for instance in the prior art as exemplified by U.S. Pat. 3,137,672 that the addition of elastomers, such as amorphous ethylene-propylene copolymers, to polyolefin improve the toughness. Such blends, however, do have lower stiffness and cannot be extruded to give clear films comparable to the present invention. Pigments, such as titanium dioxide, have been added in some cases to increase the stiffness. However, it has been our observation and it is thought the observation of other workers in this particular field of thin film manufacture that previously available blends or the like polyolefin compositions give low gloss and low transparency when extruded into thin films and sheets or similar attempted products.

Hence, it is believed apparent providing procedure for obtaining films and sheets and the like products which are tougher and better represents a highly desirable result. After extended work we have discovered procedure and compositions for use in such procedure whereby film products of enhanced toughness and other properties may be obtained.

This invention has for one object to provide a polyolefin composition which may be made into thin films or sheets having enhanced impact properties. Another object is to provide tough, high impact resistant films as aforementioned without materially sacrificing the film optical properties and stiffness. Still another object is to provide a process of extruding such manufactured film products. Other objects will appear hereinafter.

In the broader aspects of our invention we have discovered that certain specific combinations of crystalline polyethylene and substantially amorphous ethylene-propylene copolymers can be blended with crystalline polypropylene to materially improve toughness without greatly affecting the clarity and the stiffness of a thin film extruded from such composition. Polypropylene can be extruded to give stiff clear films which are used in large quantities for packaging purposes. Its optical quality and stiffness are high for a polyolefin film; however, it has not been a very tough film. Because of this brittleness, polypropylene film has not been used where tough films are required, such as packaging potatoes or large bulky objects with sharp points. Whenever elastomers, such as polyisobutylene and rubbers, have been added to polypropylene to give it toughness, the optical properties of the extruded film become so poor that the films are no longer attractive for packaging use.

In accordance with this invention we have discovered that if the elastomer added has a low molecular weight then the optical properties of the extruded blend are not greatly reduced. Further, highly crystalline polyethylene can be added to such a blend and is compatible only when the elastomer is present. This third-component, polyethylene, exerts a synergistic effect and allows a great improvement in toughness without the addition of excessive amounts of rubber. This synergism allows the achievement of extremely tough films without a great lowering of stiffness which normally accompanies the increasing toughness of polyolefins by the addition of rubbers.

Our multicomponent blends are thus unique in that they can be extruded to give tough, clear, and yet high-stiffness films. As far as we are aware, previous blends have failed to achieve these three desirable qualities. Usually it is the optical properties of previous blends which fail to meet the requirements for a packaging film. Our new three-component polyolefin films are stiff enough to be used in automatic packaging operations, tough enough to be used for packaging large heavy objects even when these objects have sharp points, and have sparkle or high gloss as well as clarity or high transparency. Because of these properties and their relatively low cost our films and sheets are useful in the packaging industry.

As will be understood by those skilled in the art, the extrusion of thin films is a different operation than injection molding, extrusion of pipes and rods, bottle blowing, and other processes used to shape plastic articles. The processability and physical property requirements for satisfactory materials used in production of thin films are more complex than other areas of plastic use. Great care must be taken not to contaminate a film quality resin or the optical properties are degraded. The minimum requirements for such a material are:

Dart impact, g. at 23° C. _____ 100
MD stiffness, p.s.i. _____ 80,000
Percent haze _____ 5
Percent gloss _____ 60
Percent transparency _____ 45

Any improvement, which is increasing these values except for haze where it is desired to decrease this value, in these lower limits is to be desired.

The multicomponent blends of our invention are principally composed of the following components which can be combined by any known blending techniques, for example, using Banbury mixers, compounding extruders, or rubber mills.

A further understanding of our invention will be had from a consideration of the several examples which follow:

Examples 7–10 illustrating this invention are given in the attached Table 1.

TABLE 1.—SYNERGISTIC EFFECT OF BLENDS IN ACCORDANCE WITH THIS INVENTION, IN 1-MIL FILMS

|  | ASTM Test Method | Example No. | | | | | | | | | | |
|---|---|---|---|---|---|---|---|---|---|---|---|---|
|  |  | 1 | 2 | 3 | 4 | 5 | 6 | 7 | 8 | 9 | 10 | 11 |
| Composition, percent: |  |  |  |  |  |  |  |  |  |  |  |  |
| Polypropylene [1] |  | 100 | 95 | 90 | 85 | 95 | 90 | 90 | 80 | 90 | 90 | 65 |
| Polyethylene [2] |  | 0 | 0 | 0 | 0 | 5 | 10 | 5 | 10 | 1.5 | 8.5 | 15 |
| EPR [3] |  | 0 | 5 | 10 | 15 | 0 | 0 | 5 | 10 | 8.5 | 1.5 | 30 |
| Dart Impact, g. at 23° C | D-1709 | 50 | 61 | 74 | 127 | 21 | 12 | 177 | 251 | 220 | 118 | 390 |
| MD Stiffness, p.s.i. | D-882 | 130,000 | 109,000 | 90,000 | 69,000 | 124,000 | 119,000 | 120,000 | 106,000 | 95,000 | 126,000 | 63,000 |
| Optical Properties: |  |  |  |  |  |  |  |  |  |  |  |  |
| Haze, percent | D-1003 | 2 | 3 | 3 | 4 | 16 | 21 | 3 | 2 | 2 | 5 | 4 |
| Gloss, percent | C-346 | 85 | 92 | 77 | 73 | 31 | 17 | 77 | 76 | 78 | 62 | 71 |
| Transparency, percent | D-1746 | 56 | 53 | 51 | 48 | 11 | 4 | 51 | 51 | 53 | 46 | 46 |

[1] This polypropylene had a melt flow of 13 g./10 min. at 230° C. and 2,160 g. load and an annealed density of 0.91 g./ml.
[2] This polyethylene had a melt index of 9 g./10 min. at 190° C. and 2,160 g. load and an annealed density of 0.97 g./ml.
[3] This EPR rubber had 50 percent ethylene and an inherent viscosity of 0.6 in tetralin at 0.1% (w./v.) at 145° C.

(A) Crystalline polypropylene conditioned density ≥0.89, preferred 0.90–0.92; melt flow rate (230° C., 2160 g.) above 12 and preferably no greater than 30, with 16–24 being most preferred. Polyallomers or copolymers of propylene may be used for this component so long as their properties meet these requirements.

(B) Crystalline polyethyelne conditioned density ≥0.93, preferred 0.95–0.97; melt index (190° C., 2160 g.) above 5 and preferred of 17–22. Copolymers of ethylene can be useful in this invention so long as they meet these requirements.

(C) Amorphous ethylene-propylene copolymer ethylene content: 20–80 percent, preferred 35–65%; inherent viscosity (tetralin at 145° C.): 0.3 to 0.9, preferred 0.5 to 0.8. Second-order transition temperature $\leq -15°$ C.; preferred $\leq -40°$ C. Ethylene-propylene terpolymers containing minor amounts (up to 10 wt. percent) of hydrocarbon diene units or other linear alpha-olefin units are useful in the practice of this invention when they conform to the foregoing specifications.

The blends of this invention have the following composition with regard to the specific components described above:

| Components, Percentage by Wt. | Limits | Preferred Limits |
|---|---|---|
| Polypropylene | 75–98.5 | 85–96 |
| Polyethylene | 0.5–10 | 1–5 |
| Ethylene-Propylene Copolymer | 1–15 | 3–10 |

The amounts of these components need to be confined reasonably within the limits indicated. When excessive amounts of the copolymer elastomer are used, the stiffness of the resulting film is so low that it cannot be processed in automatic wrapping and packaging equipment. When excessive amounts of polyethylene are present then the optical quality of the film suffers.

Our tricomponent blends may have antioxidants, slip agents, nonblocking agents, antistatic agents, antifogging agents, etc., added to them within the scope of this invention. Our blends can be extruded into films by various means such as extrusion onto a chill roll or by the tubular film extrusion technique as will be described in further detail hereinafter.

In summary to this point, certain novel multicomponent blends of polyethylene and ethylene-propylene rubbers in polypropylene give an unusual combination of toughness, stiffness and clarity of extruded films which are useful for automatic packaging operations. There are, unexpectedly, synergistic effects with these combinations which make them unusual and particularly valuable in the form of 0.2 to 10 mil films.

These examples show the synergistic effect achieved by using the three components rather than just two components. Example 1 is the control of polypropylene film. Examples 2 through 4 illustrate the effect of EPR rubber with no crystalline polyethylene in the blend while Examples 5 and 6 show the effect of crystalline polyethylene alone. Examples 7 and 8 show the unusual effect achieved by using all three components together. Comparison of the expected properties from the two component examples with those actually observed with the three-component blends are given below:

|  | Example 7 | | Example 8 | |
|---|---|---|---|---|
|  | Expected From Ex. 2 and 5 | Observed | Expected From Ex. 3 and 6 | Observed |
| Dart Impact | 21 | 177 | 12 | 251 |
| Stiffness | 109,000 | 120,000 | 90,000 | 106,000 |
| Percent Haze | 16 | 3 | 21 | 2 |
| Percent Gloss | 31 | 77 | 17 | 76 |
| Percent Transparency | 11 | 51 | 4 | 51 |

The expected values are determined by assuming the poorest or lowest value given in the study of each component separately. This is a normal effect in film experiments, e.g., that the blend will take the lowest properties determined by each component. Even if the highest values are taken from the two component examples there is an obvious synergistic effect on the dart impact strength. It is believed unexpected that such a blend will have excellent optical properties, improved toughness, and yet retain high stiffness. Such an effect is very valuable and completely unexpected from previous experience with blend samples extruded into films.

Examples 9 and 10: These examples illustrate that different ratios of the components can be used depending upon the desired effect. If high optical properties with high toughness is desired, it is best to use a large quantity of EPR rubber. Whereas if high stiffness is desired, a larger quantity of crystalline polyethylene is preferred.

Example 11: This example illustrates that if too large a quantity of each component is added then the stiffness falls to such a low level that the films cannot be used in normal automatic packaging operations, although they have good opticals and toughness.

Examples 12–16: In Table 2 concerning Examples 12–16 there is illustrated the effect of changing the molecular weight or inherent viscosity of the EPR or elastomeric component. In Example 12 the inherent viscosity is not high enough to give best toughness as indicated by the dart impact strength. In fact, the toughness does not appear to be improved over the control given in Example 1. The toughness is satisfactory for the remainder of the samples given in Table 2, but the optical properties decrease as the inherent viscosity of the EPR rubber increases. In Examples 15 and 16 the optical properties are such these films probably would not be desirable for packaging films. The films of Examples 12–14 were transparent, 15 was translucent, and 16 was opaque. In Examples 17–21 in Table 3 is illustrated the effect of the molecular weight or melt index of the crystalline polyethylene component. The films of Examples 17 and 18 are translucent and do not have acceptable optical properties. The films of the remaining examples (19, 20, 9, 21) all are transparent and have exceptional optical properties for the level of stiffness and touchness of the film.

TABLE 2.—EFFECT OF I.V. OF EPR COMPONENT IN 1-MIL FILMS

| Composition | Example No. | | | | | |
|---|---|---|---|---|---|---|
| | 12 | 13 | 9 | 14 | 15 | 16 |
| | Same as Example 9 Except for I.V. of EPR | | | | | |
| Inherent Viscosity of EPR 145° C. in tetralin | 0.1 | 0.3 | 0.6 | 0.9 | 1.6 | 2.3 |
| Dart Impact, g. at 23° C | 49 | 107 | 220 | 261 | 313 | 355 |
| MD Stiffness, p.s.i | 100,000 | 101,000 | 95,000 | 103,000 | 107,000 | 100,000 |
| Optical Properties: | | | | | | |
| Haze, percent | 2 | 2 | 2 | 4 | 8 | 14 |
| Gloss, percent | 84 | 81 | 78 | 66 | 47 | 34 |
| Transparency, percent | 55 | 55 | 53 | 46 | 22 | 16 |

TABLE 3.—EFFECT OF MI OF POLYETHYLENE COMPONENT IN 1-MIL FILMS

| Composition | Example No. | | | | | |
|---|---|---|---|---|---|---|
| | 17 | 18 | 19 | 20 | 9 | 21 |
| | Same as Example 9 Except for MI of Polyethylene | | | | | |
| MI of Polyethylene, g./10 min. 190° C | 0.2 | 0.7 | 3 | 5 | 9 | 20 |
| Dart Impact, g. at 23° C | 411 | 395 | 321 | 283 | 220 | 211 |
| MD Stiffness, p.s.i | 101,000 | 107,000 | 97,000 | 103,000 | 95,000 | 106,000 |
| Optical Properties: | | | | | | |
| Haze, percent | 9 | 6 | 4 | 2 | 2 | 2 |
| Gloss, percent | 48 | 56 | 68 | 73 | 78 | 82 |
| Transparency, percent | 31 | 39 | 49 | 51 | 53 | 59 |

TABLE 4.—EFFECT OF M7 OF POLYPROPYLENE COMPONENT IN 1-MIL FILMS

| | Example No. | | | | |
|---|---|---|---|---|---|
| | 22 | 9 | 23 | 24 | 25 |
| Composition | Same as Example 9 except for MF of polypropylene. | | | | |
| MF of polypropylene, g./10 min., 230° C | 18 | 13 | 11 | 4 | 1 |
| Dart Impact, g. at 23° C | 212 | 220 | 230 | 217 | 184 |
| MD Stiffness, p.s.i | 96,000 | 95,000 | 92,000 | 97,000 | 89,000 |
| Optical Properties: | | | | | |
| Haze, percent | 1 | 2 | 4 | 7 | 13 |
| Gloss, percent | 85 | 78 | 69 | 52 | 34 |
| Transparency, percent | 61 | 53 | 46 | 36 | 21 |
| Clarity | (¹) | (¹) | (²) | (²) | (³) |

¹ Transparent. ² Translucent. ³ Opaque.

In the above examples the films were all made in substantially the same manner. That is, a Modern Plastics Machinery, Model 100–29 extruder was charged with in certain instances the one component polypropylene or in other instances two components or in further instances the multicomponents of the present invention. In the case of the multicomponents of the present invention the multicomponents were blended together in a Banbury apparatus for approximately six minutes to insure a thorough intermingling of the several components.

The temperature of extrusion was in the range of 440° F. to 500° F. which is normal for polypropylene homopolymer using this extruder.

Extruders other than the Modern Plastics Machinery, Model 100–29 can be used to make the unique high quality film described herein and may require temperatures outside the 440° F. to 500° F. range for optimum performance.

In order to further show the importance of the composition in obtaining such high quality film, the data in Table 4 are given. Here the effect of the melt flow of the polypropylene on optical properties is given. Example 9 is satisfactory and Example 22 has excellent optical properties and no significant loss of impact strength or stiffness. Example 24 is completely unsatisfactory due to using polypropylene of MF=4.

The examples in Table 5 below are given to illustrate additives useful in the present invention.

Example 9 is a base composition containing no additives, while Example 26 shows that an effectively stabilized composition having antioxidants contains good physical and optical properties. The 0.1% Superfloss in Example 27 in an antiblocking agent and shows no detrimental effect upon critical physical or optical properties. The 0.1% N-2,3-dihydroxypropyl amide of cis-9-octadecenoic acid in Example 28 is an antifogging agent, and the 0.75% Michelene 616 in Example 29 is an antistatic agent. The physical and optical properties of these two compositions were not significantly changed from that of the base composition. The 0.2% oleamide composition (Example 30) which is a slip agent shows low coefficient of friction and has good physical and optical properties.

TABLE 5.—EFFECT OF ADDITIVES ON POLYOLEFIN BLEND ª FILMS

| | Example No. | | | | | |
|---|---|---|---|---|---|---|
| | 9 | 26 | 27 | 28 | 29 | 30 |
| Type Additive | None | Antioxidants | Antiblocking | Antifogging | Antistatic | Slip. |
| Additive, percent | | 0.3% DLTDP ᵇ, 0.2% SWP ᶜ | 0.1% Superfloss | 0.1% ᵈ | 0.75% ᵉ | 0.2% Oleamide. |
| Dart Impact, g. at 23° C | 220 | 230 | 215 | 225 | 220 | 225. |
| MD Stiffness, p.s.i | 95,000 | 98,000 | 94,000 | 99,000 | 96,000 | 93,000. |
| Optical Properties, percent: | | | | | | |
| Haze | 2 | 2 | 2 | 2 | 2 | 2. |
| Gloss | 78 | 77 | 80 | 76 | 79 | 77. |
| Transparency | 53 | 53 | 55 | 52 | 54 | 53. |
| Clarity | Transparent | Transparent | Transparent | Transparent | Transparent | Transparent. |

ª Polyolefin compositions same as Example 9. Additives are the only change.
ᵇ DLTDP=dilauryl 3,3'-thio dipropionate.
ᶜ SWP=Santowhite Powder (Monsanto Chem. Co.).
ᵈ N-2,3-dihydroxypropyl amide of cis-9-octadecenoic acid.
ᵉ Michelene 616 (M. Michel and Co.).

In Example 31 the films produced from the composition in Examples 9 and 16 were used to wrap meat. The meat could be visibly examined and its color determined through the film from Example 9, whereas with the film from Example 16 the object wrapped could not even be identified by visual observation.

As already indicated above, films in accordance with the present invention may also be made by tubular extrusion and a number of samples so made with our novel tri-component composition gave films of enhanced quality.

It is believed apparent from the extensive data and comparisons set forth that it can be seen our novel synergistic components when processed with reasonably rapid cooling of the film results in thin films of enhanced properties as described in detail above.

The invention has been described in detail with particular reference to preferred embodiments thereof, but it will be understood that variations and modifications can be effected within the spirit and scope of the invention as described hereinabove and as defined in the appended claims.

We claim:

1. A composition blend capable of being formed into optically clear products, comprising about 75%–98.5% by weight of a crystalline polypropylene having a density $\geq 0.89$ and a melt flow of from 16 to 24, about 0.5%–10% by weight of a crystalline polyethylene having a density $\geq 0.93$ and a melt index $\geq 5$, and about 1%–15% by weight of a low molecular weight amorphous ethylene-propylene copolymer having an inherent viscosity of about 0.3–0.9 and a second order transition temperature $\leq -15°$ C.

2. An optically clear product formed from the composition blend of claim 1.

3. The invention according to claim 2 wherein said product is a sheet or film having the following properties: haze $\leq 5\%$; gloss $\geq 60\%$; transparency $\geq 45\%$; minimum stiffness of 80,000 p.s.i.; and a minimum dart impact strength of 100 g. at 23° C.

References Cited

UNITED STATES PATENTS 3,256,367   6/1966   Jayne _____ 260—897

MURRAY TILLMAN, Primary Examiner

C. J. SECCURO, Assistant Examiner

U.S. Cl. X.R.

260—76